(12) United States Patent
Hebert et al.

(10) Patent No.: US 6,845,820 B1
(45) Date of Patent: Jan. 25, 2005

(54) COMPLETION APPARATUS AND METHODS FOR USE IN HYDROCARBON WELLS

(75) Inventors: John Emile Hebert, Houma, LA (US); Patrick John Seely, Houma, LA (US); Joseph Jude Boudreaux, Houma, LA (US); Thomas A. Dupré, Bourg, LA (US)

(73) Assignee: Weatherford/Lamb, Inc., Houston, TX (US)

( * ) Notice: Subject to any disclaimer, the term of this patent is extended or adjusted under 35 U.S.C. 154(b) by 50 days.

(21) Appl. No.: 09/692,592

(22) Filed: Oct. 19, 2000

(51) Int. Cl.⁷ .............................................. E21B 43/10
(52) U.S. Cl. ........................ 166/285; 166/207; 166/380
(58) Field of Search ................................ 166/285, 380, 166/207, 177.4, 206, 242.8

(56) References Cited

U.S. PATENT DOCUMENTS

| | | | | |
|---|---|---|---|---|
| 3,412,565 A | * | 11/1968 | Lindsey et al. ............. | 166/207 |
| 4,413,682 A | * | 11/1983 | Callihan et al. ............ | 166/382 |
| 4,708,202 A | | 11/1987 | Sukup et al. ............... | 166/123 |
| 5,337,823 A | | 8/1994 | Nobileau .................... | 166/277 |
| 5,794,702 A | * | 8/1998 | Nobileau .................... | 166/380 |
| 5,918,677 A | * | 7/1999 | Head .......................... | 166/380 |
| 6,135,208 A | * | 10/2000 | Gano et al. ................. | 166/313 |
| 6,302,205 B1 | * | 10/2001 | Ryll ......................... | 166/250.12 |
| 6,457,532 B1 | * | 10/2002 | Simpson ..................... | 166/380 |

FOREIGN PATENT DOCUMENTS

| | | | |
|---|---|---|---|
| FR | 2 741 907 | 6/1997 | ............. E21B/7/20 |
| WO | WO 99/35368 | 7/1999 | ........... E21B/43/10 |
| WO | WO 00/77431 | 12/2000 | |

OTHER PUBLICATIONS

International Search Report from the European Patent Office for International Appl. No. PCT/GB01/04584, dated Feb. 18, 2002.

* cited by examiner

Primary Examiner—William Neuder
(74) Attorney, Agent, or Firm—Moser, Patterson & Sheridan, L.L.P.

(57) ABSTRACT

The present invention provides a cement shoe assembly for use on a string of tubulars in a well. In one aspect of the invention, the cement shoe assembly includes a housing having a lower portion with an enlarged inside diameter and a drillable cement shoe disposed therein. The shoe includes a weakened portion of material adjacent the enlarged inside diameter portion of the housing and ensures that as a cutting tool passes through the housing, all portions of the cement shoe are removed from the enlarged inside diameter portion, leaving a connection surface clear of debris for a subsequent tubular string. When a smaller tubular is expanded into the enclosed diameter portion of the housing, a connection is made therebetween without enlarging the outer diameter of the housing.

33 Claims, 3 Drawing Sheets

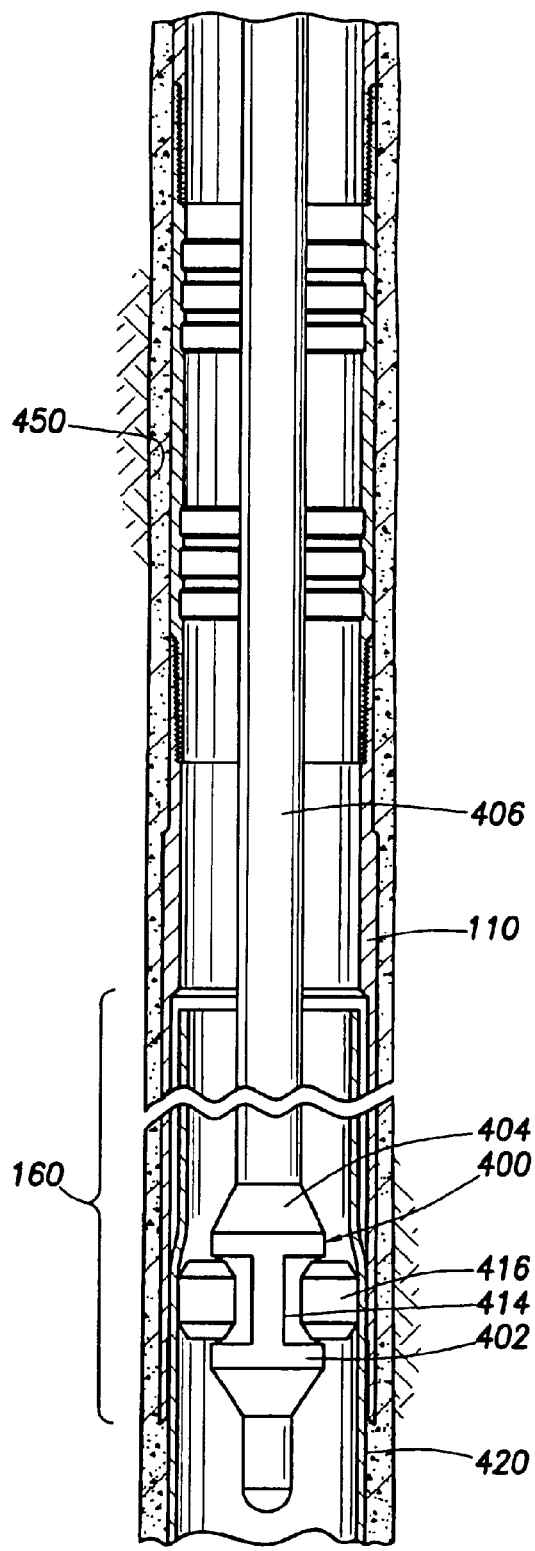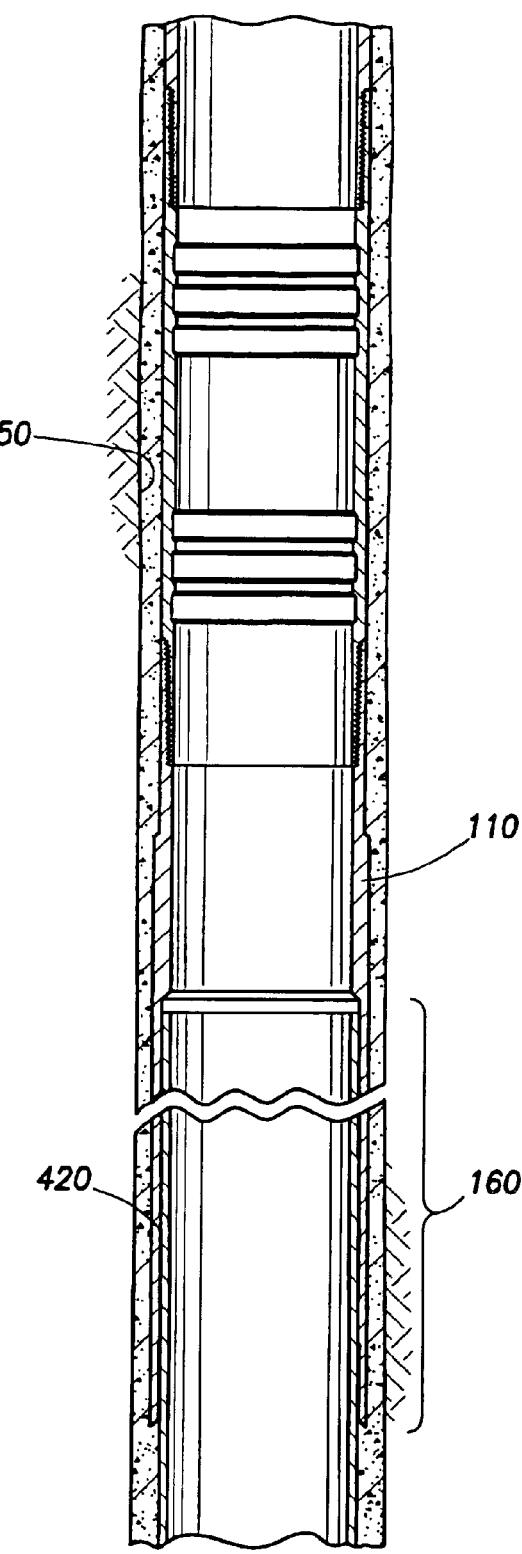

COMPLETION APPARATUS AND METHODS FOR USE IN HYDROCARBON WELLS

BACKGROUND OF THE INVENTION

1. Field of the Invention

The present invention provides an apparatus and methods for use in a hydrocarbon wellbore. More particularly the invention provides apparatus and methods for completing hydrocarbon wells. Still more particularly, the invention provides a cement shoe assembly for use in monobore wells.

2. Background of the Related Art

In the drilling of a hydrocarbon well, the borehole is physically lined with strings of pipe or tubulars (pipe or casing) to prevent the walls of the borehole from collapsing and to provide a reliable path for well production fluid, drilling mud and other fluids that are naturally present or that may be introduced into the well. Typically, after the well is drilled to a new depth, the drill bit and drill string are removed and a string of pipe is lowered into the well to a predetermined position whereby the top of the pipe is at about the same height as the bottom of the existing string of pipe (liner). Thereafter, with the new string of pipe held in place either temporarily or with some mechanical hanger, a column of cement is pumped into the pipe and forced to the bottom of the borehole where it flows out of the pipe and flows upwards into an annulus defined by the borehole and the pipe. The two principal functions of the cement between the pipe and the borehole are to restrict fluid movement between formations and to support the pipe.

To save time and money, apparatus to faciltate cementing are often lowered into the borehole along with a pipe to be cemented. Cementing apparatus typically includes a number of different components made up at the surface prior to run-in. These include a tapered nose portion located at the downhole end of the pipe to facilitate insertion thereof into the borehole. A check valve at least partially seals the end of the tubular and prevents entry of well fluid during run-in while permitting cement to subsequently flow outwards. The same valve or another valve or plug typically located in a baffle collar above the cementing tool prevents the cement from back flowing into the pipe. Components of the cementing apparatus are made of fiberglass, plastic, or other disposable material, that, like cement remaining in the pipe, can be drilled when the cementing is complete and the borehole is drilled to a new depth.

Historically, each section of pipe inserted to line a borehole was necessarily smaller in diameter than the section of pipe previously inserted. In this manner, a wellbore was formed of sequential strings of pipe of an ever-decreasing inner and outer diameter. Recently, methods and apparatus for expanding the diameter of pipe in a wellbore have advanced to the point where it has become commercially feasible to utilize the technology. This has led to the idea of monobore wells wherein through the expansion of tubulars in the wellbore, the wellbore remains at about the same diameter throughout its length. The advantages of the monobore well are obvious. The tubulars lining the borehole, and therefore the possible path for fluid in and out of the well remains consistent regardless of well depth. Additionally, tools and other devices can more easily be run into the well without regard for the smaller diameters of tubulars encountered on the way to the bottom of the wellbore.

In a monobore well, a first string of tubulars is inserted into the wellbore and cemented therein in a conventional manner. Thereafter, a string of tubulars having a smaller diameter is inserted into the wellbore as in prior art methods. However, after insertion into the wellbore the second string of tubulars is expanded to approximately the same inner and outer diameter as the first string. The strings can be connected together by use of a conventional hanger or, more typically, the smaller tubing is simply expanded into the interior of the larger diameter tubing thereabove in an area where the pipes overlap.

With the advent of monobore wells, certain problems have arisen. One problem relates to the expansion of the smaller tubular into the larger tubular to form the connection therebetween. Current methods of expanding tubulars in a wellbore to create a connection between tubulars requires the application of a radial force to the interior of the smaller tubular and expanding its diameter out until the larger tubular is itself pushed passed its elastic limits. The result is a connection having an outer diameter greater than the original outer diameter of the larger tubular. While the increase in the outer diameter is minimal in comparison to the overall diameter, there are instances where expanding the diameter of the larger pipe is difficult or impossible. For example, in the completion of a monobore well, the upper string of tubulars is preferably cemented into place before the next string of tubulars is lowered into the well and its diameter expanded. Because the annular area between the outside of the larger pipe and the borehole therearound is filled with cured cement, the diameter of the larger pipe cannot expand past its original shape.

Therefore, a need exists for a connection means between two tubulars in a wellbore whereby a smaller tubular can be expanded into a larger tubular without the need for expanding the outer diameter of the larger tubular during the expansion process. There is a further need for an apparatus for running a string of pipe into a wellbore including a cement shoe whereby, a another string of tubular can be subsequently expanded into the first string without increasing the outer diameter of the larger pipe. There is yet a further need for a cement shoe assembly which can be run into a well at the end of a string of tubulars and which can subsequently be drilled out leaving a portion of a cement shoe housing clear for connection to another smaller tubular by expansion means.

SUMMARY OF THE INVENTION

The present inventionprovides a cement shoe assembly for use on a string of tubulars in a well. In one aspect of the invention, the cement shoe assembly includes a housing having a lower portion with an enlarged inside diameter and a drillable cement shoe portion disposed therein. The shoe includes a weakened portion of material adjacent the enlarged inside diameter portion of the housing and ensures that as a cutting tool passes through the housing, all portions of the cement shoe are removed from the enlarged inside diameter portion, leaving a connection surface clear of debris for a subsequent tubular string. When a smaller tubular is expanded into the enclosed diameter portion of the housing, a connection is made therebetween without enlarging the outer diameter of the housing. In another aspect of the invention, the cement shoe includes a longitudinal bore providing a passageway for cement and other fluids with composite material therearound. Radial formations extend from the outer surface of the longitudinal bore to the inside surface of the enlarged inner diameter portion of the body, thereby assuring that as a drilling tool passes through the body, any material along the surface of the enlarged inside diameter portion of the housing will fall away, leaving the portion free of debris.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a section view of a wellbore showing the housing of the cement shoe assembly cemented in place and a second tubular therebelow being expanded into the housing with an expansion tool.

FIG. 5 is a section view of the wellbore of FIG. 4, showing a completed connection formed between the housing of the cement shoe assembly and the second tubular.

DETAILED DESCRIPTION OF THE PREFERRED EMBODIMENT

Figure 1:
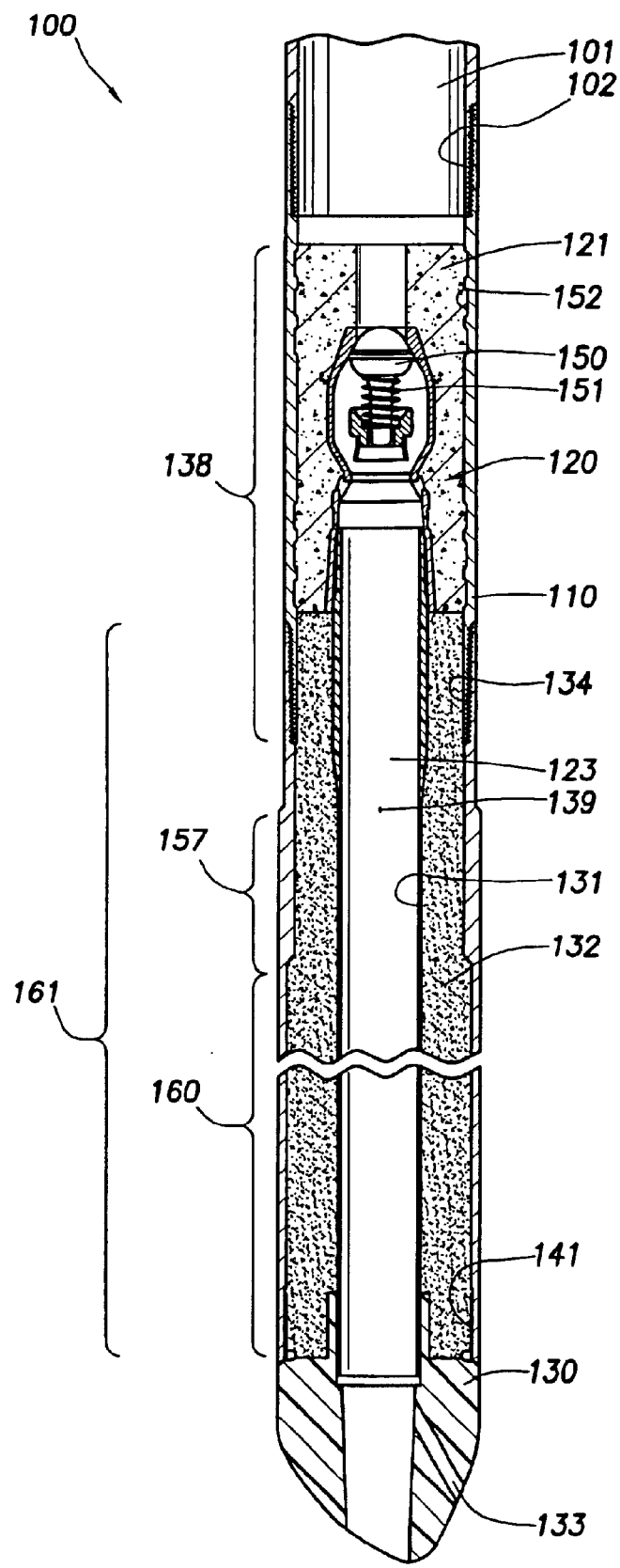
FIG. 1 is a side view in section of the cement shoe assembly of the present invention.

FIG. 1 is a section view of a cement shoe assembly 100 of the present invention. The assembly 100 is typically disposed at the end of a string of tubulars that is run into a well and cemented therein to isolate the wellbore from the formation therearound. The assembly 100 is preferably connected to a tubular 101 by a threaded connection 102 formed therebetween. The cement shoe assembly 100 includes a housing 110 and a drillable shoe portion 120 disposed within the housing. The drillable shoe portion 120 includes a longitudinal bore 123 extending through the center of the cement shoe and providing a fluid path for cement and well fluids. At an upper end, the bore 123 communicates with the tubular 101. Therebelow, a biased, one way valve 150 is disposed in the bore 123 permitting fluid to enter from the well surface but preventing well fluids from passing from the wellbore into tubular 101. In the embodiment shown, a spring 151 biases the valve 150 in a closed position. Adjacent valve 150, an annular area 121 defined between the bore and the housing 110 is filled with concrete to stabilize the bore 123. The housing 110 surrounding the concrete is equipped with upsets 152 to hold the concrete in place and prevent axial movement thereof. Lining the bore 123 between the valve 150 and a conical nose portion 130 is a tubular member 131. Adjacent the tubular member 131, an annular area 132 between the tubular member and the housing 110 is filled with sand or some other aggregate. The purpose of the sand is to support the tubular member 131 in the center of the bore 123 and to prevent migration of cement from the bore 123 to the well of the housing 110 through pressure equalization ports 139 formed in tubular member 131.

At a lower end of the assembly 100 is conical nose portion 130. The conical nose portion serves to direct fluid into and out of the assembly 100. Additionally, the offset, conical shape of the nose portion 130 aids in run-in of the assembly by facilitating the passage of the assembly 100 through the borehole. The construction and the shape of nose portion 130 is illustrated in detail in FIG. 2, an enlarged, section view thereof. At an upper end 136 the nose portion fits into housing 110 and is attached thereto with a threaded connection 134. A central bore 143 of the nose portion 130 is aligned with longitudinal bore 123 of the shoe portion 120. The nose portion 130 also includes at least one side port 133 for the passage of cement from the longitudinal bore 123 to the borehole (not shown). The nose portion 130 is constructed of drillable material having wear resistant, drillable characteristics. Fiberglass or some other composite material is typically used to form the conical nose portion 130. Located at an outer edge of the nose portion 130, at a point where the nose portion meets the edge of the housing 110, is a groove 171 formed around the perimeter nose portion. The groove 171 is constructed and arranged to ensure that the lower nose portion 135 falls away from the housing 110 as the shoe portion 120 and the upper nose portion 136 is drilled in the wellbore as will be described herein.

Figure 2:
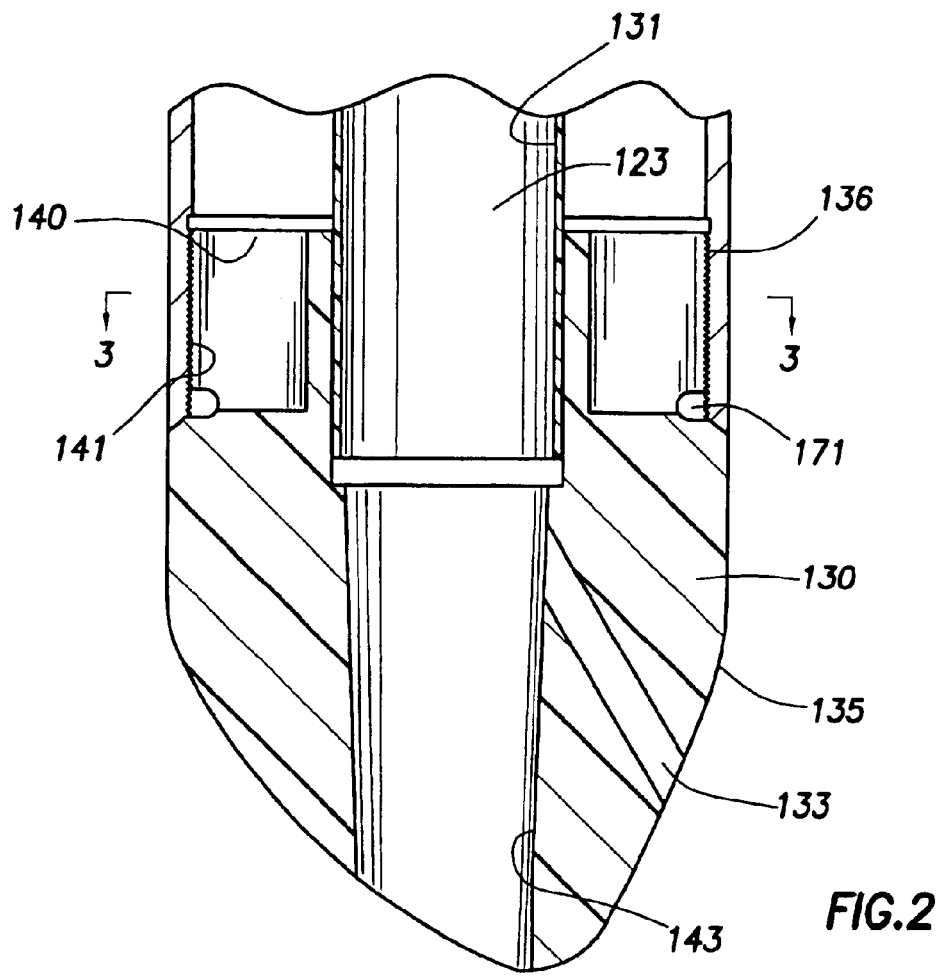
FIG. 2 is a more detailed section view of the conical nose portion of the cement shoe assembly shown in FIG. 1.
Figure 3:
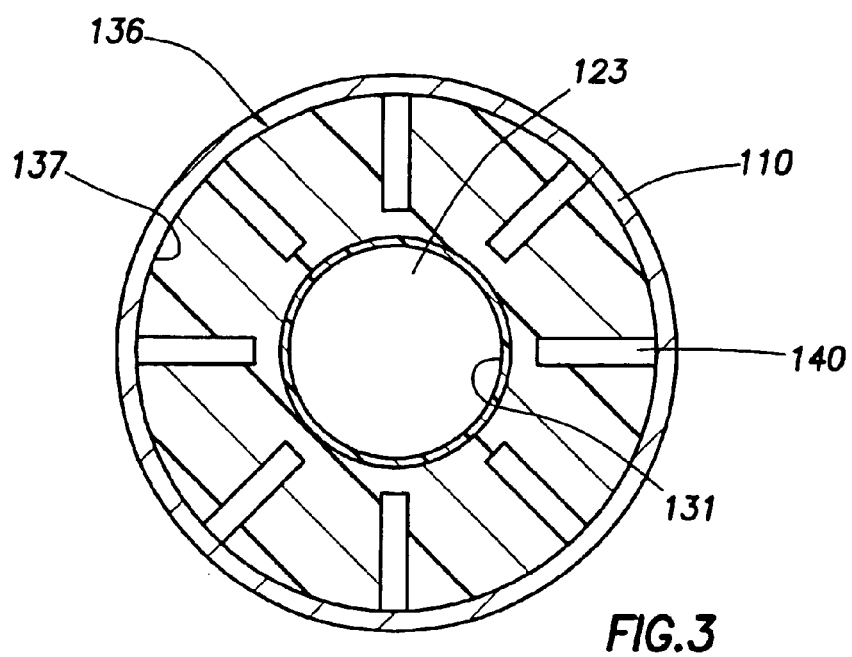
FIG. 3 is a downward, cross-sectional view of the cement shoe assembly of FIG. 1 taken through a line 3—3 of FIG. 2.

Also included in the upper portion 136 of the conical nose portion 130 are a plurality of radially extending formations 140 originating at an inner edge 137 of the housing 110 and extending inward to terminate adjacent the tubular member 131. In the preferred embodiment, the formations 140 are voids formed in the composite material of the conical nose portion. FIG. 3 is a section view of the nose portion of the assembly taken along a line 3—3 of FIG. 2. FIG. 2 illustrates the relative height of the formations 140 and FIG. 3 illustrates the width and length of each formation 140. The purpose of the formations is to ensure that the outermost portions of the upper nose portion 136 fall away from the housing 110 as the shoe portion is drilled as will be explained herein.

Visible specifically in FIGS. 1, 4 and 5, the outer housing 110 of the assembly is a two piece housing with a threaded connection 134 between an upper 138 and lower 161 portions. In the embodiment shown, the upper portion 138 of the housing 110 has approximately the same outer diameter as the tubular 101 thereabove. The lower portion 161 of the housing includes an area of increased wall thickness 157 terminating in an area of the housing 160 having an enlarged inner diameter. The enlarged inside diameter area 160 is designed to provide a non-expanding mating surface for the upper portion of a tubular when the tubular is expanded into housing 110 as described herein.

In the completion of a well utilizing the cement shoe assembly of the present invention, an initial or subsequent section of borehole is drilled to a predetermined depth in the earth. Thereafter, a string of tubular is run into the new borehole with the cement shoe assembly 100 disposed at a lower end thereof. With the tubular string fixed in the wellbore and the cement shoe assembly 100 near the bottom of the borehole, cement is injected into the wellbore with the tubular string providing a fluid path for the cement. When the flowing cement reaches cement shoe assembly 100, it passes through one-way valve 150, through longitudinal bore 123 and exits the central bore 143 of the conical nose portion 130 as well as side ports 133. Upon reaching the bottom of the borehole, the cement is then forced up an annular area formed between the outer surface of the housing 110 and the borehole therearound (not shown). A column of fluid is then pumped into the tubular string after the cement to ensure that most of the cement exits the lower end of the cement shoe assembly 100. Thereafter, the cement is allowed to cure and subsequently, a drilling tool is run into the wellbore inside of the tubular string and the drillable shoe portion 120 and conical nose portion 130 are drilled up and destroyed, leaving only the housing 110. Thereafter, a new length of borehole is drilled and subsequently lined with another tubular string. The upper portion of the new string of tubular is subsequently expanded into the enlarged inside diameter portion 160 of housing 110 of the cement shoe assembly 100.

In a conventional cement shoe, the inside diameter of the cement shoe housing is only slightly larger than the outer diameter of a drilling tool used to drill the drillable cement shoe portion 120. This ensures that the material making up the cement shoe is removed. In the present invention, as illustrated in the Figures, the housing 110 of the cement shoe assembly is not a uniform inside diameter but includes larger inside diameter area 160. As previously explained, the larger inside diameter area 160 permits the expansion of a tubular into the housing without expanding the outside diameter of the housing 110. In this manner a connection may be made between the housing and another piece of tubular, even when the housing is cemented into place in the wellbore and its outer diameter cannot be expanded.

In order to ensure that all portions of the shoe portion 120 and conical nose portion 130 fall free of housing 110 in the enlarged inside diameter area 160, the formations 140 in the upper portion of the conical nose portion are designed to remove all radial support for any material left between the drill and the wall of the housing 110 when the drilling tool passes through the housing 110. Considering FIG. 1, a drilling tool, when passing through the upper portion 138 of the housing 110, will contact, break-up and loosen all material and components in the upper portion 138 of the housing. Debris from the material and components is carried to the surface by circulating fluids. Likewise, as the drilling tool passes from the housing 110 to the conical portion 130 it will intersect groove 171 and the lower conical portion 135 will be dislodged from housing 110. However, as the cutting tool passes through the enlarged inside diameter portion 160 of housing 110, some material making up the upper portion 136 of the conical nose portion will not be directly contacted by the drilling tool. As is visible in FIG. 3, formations 140 remove any radial support of composite material which might remain in a ring-like shape after the drilling tool passes through the upper portion 136 of the conical nose portion 130.

As described above, after the drillable components and material making up the shoe portion 120 are drilled up, the larger inside diameter area 160 of the housing remains as a mating surface for the expansion of a tubular having a smaller diameter. FIG. 4 is a section view of a wellbore illustrating housing 110 cemented into place in a borehole 450 and a tubular 420 therebelow being expanded into the larger inside diameter area 160 of housing 110. Typically, after a new string of tubular is fixed in the wellbore, an expansion tool 400 will be run into the well on a run-in string of tubular 406 and used to enlarge the inner and outer diameter of the tubular string to the size of the tubular string thereabove. FIG. 4 illustrates one expansion tool 400 typically used to expand a tubular string in a "bottom-up" fashion.

The expansion tool 400 operates with pressurized fluid supplied through run-in string 406. The expansion tool 400 includes a body 402 which is hollow and generally tubular with a connector 404 for connection to the run-in string 406. The body 402 includes at least two recesses 414 to hold a respective roller 416. Each of the mutually identical rollers 416 is near-cylindrical and slightly barreled. Each of the rollers 416 is mounted by means of a bearing (not shown) at each end of the respective roller for rotation about a respective rotation axis which is parallel to the longitudinal axis of the expansion tool 400 and radially offset therefrom. The inner end of a piston (not shown) is exposed to the pressure of fluid within the hollow core of the tool 400 and the pistons serve to actuate or urge the rollers 416 against the inside wall of a tubular therearound. In FIG. 4, the expansion tool 400 is shown in an actuated position and is expanding the diameter of a tubular into a bore defined by the larger inside diameter area 160 of housing 110. Typically, the expansion tool 400 rotates as the rollers are actuated and the tool is urged upwards in the wellbore. In this manner, the expansion tool can be used to enlarge the diameter of a tubular circumferentially to a uniform size and to a predetermined length in the wellbore. FIG. 5 illustrates a completed connection between the enlarged diameter area 160 of housing 110 and the tubular 420. As illustrated, the inside and outside diameter of the tubular 420 has been increased as the tubular is expanded past its elastic limits. However, the enlarged inside diameter area 160 of housing 110 has not expanded in diameter. In this manner, the tubular 420 is successfully affixed to the housing 110 without expanding the diameter of the housing. Additionally, the inside dianfeter of the housing 110 and the tubular 420 are substantially the same.

The connection arrangement disclosed herein and shown in FIGS. 4 and 5 is not limited to use with a cement shoe assembly and can be used to join tubulars at any location downhole when a connection between tubulars is desired without expanding the outer diameter of the larger tubular. For example, the apparatus and method can be utilized anytime cement, formations or any other material surrounding the outer tubular make it difficult or impossible to use an expansion technique requiring the expansion of the larger tubular. Additionally, the methods and apparatus disclosed and claimed herein can be used in any well and are not necessarily limited to use in a hydrocarbon well.

While the foregoing is directed to the preferred embodiment of the present invention, other and further embodiments of the invention may be devised without departing from the basic scope thereof, and the scope thereof is determined by the claims that follow.

What is claimed is:

1. A cement shoe assembly for use in a wellbore comprising:
   a tubular housing for disposal at an end of a tubular string, the housing having an enlarged inner diameter portion at the lowermost end of the housing and a drillable material disposed in the enlarged inner diameter portion; and
   a drillable cement shoe portion disposed in the housing, the cement shoe portion in selective fluid communication with the tubular string,
   wherein the drillable material is predisposed to substantially fall away from the housing when drilled.

2. The cement shoe assembly of claim 1, wherein the drillable cement shoe includes a valve member providing the selective communication with the tubular.

3. The cement shoe assembly of claim 1, wherein the drillable material outside a reach of a cutting tool is predisposed to fall away from the housing upon passing the cutting tool through the housing.

4. A method of connecting a first tubular to a second tubular in a wellbore, the method comprising:
   providing a cement shoe assembly having a housing and drillable cement shoe, the assembly disposed at a lower end of a first tubular string;
   cementing the housing in the wellbore by injecting cement into an annular area defined by the housing and a borehole therearound;

drilling the cement shoe to leave only the housing thereof, the housing having an area of increased inside diameter at a lower end thereof;

aligning an upper portion of the second tubular with the area of increased inside diameter of the housing; and expanding the upper portion of the second tubular by placing a radially expansive force upon an inner wall thereof, until the second tubular is in frictional contact with the area of increased inside diameter of the housing and the outer diameter of the housing is not substantially expanded.

5. A cement shoe assembly for completion of a lined wellbore, the assembly comprising:

a housing for disposal at a lower end of a tubular string, the housing having a first upper inside diameter and a lower, enlarged inside diameter;

a drillable shoe portion in the housing including:

a bore extending longitudinally therethrough for the selective passage of fluids;

drillable material disposed in an annular area between the bore and the inside surface of the housing, the drillable material selected from a list including cement, concrete, sand and composite materials;

a nose portion disposed on a lower end of the housing, the nose portion having at least one aperture therethrough; and formations formed in the drillable material adjacent the lower, enlarged inside diameter portion of the housing, the formations constructed and arranged to urge the material away from the housing when the cement shoe is drilled.

6. A connection made in a wellbore between two tubulars, the connection comprising:

a first tubular having an inside surface, the first tubular having an upset portion at its lower end wherein the first tubular decreases in wall thickness; and a second tubular having an expanded diameter in contact with the inside surface of the first tubular, whereby the diameter of the first tubular is not substantially expanded and an inside diameter of both tubulars is substantially the same.

7. The connection of claim 6, wherein the inside surface of the first tubular is an enlarged diameter portion.

8. A method of forming a connection in a wellbore between a first, larger diameter tubular and a second, smaller diameter tubular without enlarging the diameter of the first tubular, comprising:

providing the first tubular with an area of enlarged inside diameter at a lower end thereof, wherein a wall of the first tubular decreases in thickness at the area of enlarged inside diameter;

locating the second tubular coincident with the enlarged inside diameter of the first tubular; and expanding the second tubular through use of radial force on an inside surface thereof, whereby an outer surface of the second tubular expands outward to meet and frictionally contact the enlarged inside diameter portion of the first tubular without substantially enlarging the diameter of the first tubular.

9. The method of claim 8, wherein a hydraulically operated expander tool applies the radial force to the inside surface of the second tubular.

10. A method of forming a connection between two wellbore tubulars comprising the steps of:

placing a first wellbore tubular having an outer diameter and a first end in proximity of a second wellbore tubular, the second wellbore tubular having an enlarged inner diameter portion formed by reducing a thickness of a wall of the second wellbore tubular at a second end, wherein the enlarged inner diameter portion is proximate the second end;

inserting the first end of the first tubular into the second end of the second tubular; and expanding the first end of the first tubular, such that the outer diameter comes into connecting contact with the enlarged inner diameter portion.

11. The method of claim 10, wherein an expander tool with radially extendable members is used to expand the first end of the first tubular.

12. A cement shoe assembly for use in a wellbore, comprising:

a tubular housing for disposal at an end of a tubular string, the housing having an enlarged inner diameter portion located at a lower end of the housing;

a drillable cement shoe portion disposed in the housing, the cement shoe portion in selective fluid communication with the tubular string; and a drillable, nose portion disposed on a lower end of the housing to facilitate insertion of the assembly into the wellbore and having a bore therethrough substantially coincident with a bore of the cement shoe portion, wherein the drillable material of the assembly adjacent the enlarged inner diameter portion of the housing is constructed and arranged to become dislodged from the housing when the shoe is drilled with a drill having an outer diameter smaller than the enlarged inner diameter portion of the housing and the drillable material is weakened by voids formed therein that terminate at an inner surface of the enlarged inner diameter portion of the housing.

13. The cement shoe assembly of claim 12, wherein the voids formed in the drillable material each extend radially from a point proximate a central tubular member to the inner surface of the enlarged diameter portion.

14. The cement shoe assembly of claim 13, wherein some of the drillable material is a composite material.

15. The cement shoe assembly of claim 14, wherein some of the composite material is fiberglass.

16. A method of forming a connection in a wellbore between a first, larger diameter tubular and a second, smaller diameter tubular without enlarging the diameter of the first tubular, comprising:

providing the first tubular with an area of enlarged inside diameter at a lower end thereof, wherein the first tubular comprises a housing of a cement shoe;

locating the second tubular coincident with the enlarged inside diameter of the first tubular; and expanding the second tubular through the use of radial force on the inside surface thereof, whereby the outer surface of the second tubular expands outward to meet and frictionally contact the enlarged inside diameter portion of the first tubular without substantially enlarging the diameter of the first tubular.

17. A method of forming a connection between two wellbore tubulars comprising the steps of:

placing a first wellbore tubular having an outer diameter and a first end in proximity of a second wellbore tubular having an enlarged inner diameter portion and a second end wherein the enlarged inner diameter portion is proximate the second end and the second tubular comprise a housing of a cement shoe;

inserting the first end of the first tubular into the second end of the second tubular; and expanding the first end of the first tubular such that the outer diameter comes into connecting contact with the enlarged inner diameter portion.

18. A connection made in a wellbore between two tubulars, the connection comprising:

a first tubular having an inside surface, wherein the inside surface is an enlarged inner diameter portion and the first tubular is a housing of a cement shoe; and a second tubular having an expanded diameter in contact with the inside surface of the first tubular, whereby the diameter of the first tubular is not substantially expanded and an inside diameter of both tubulars is substantially the same.

19. The connection of claim 18, wherein the second tubular includes a string of tubulars, all of which have an expanded diameter.

20. A method of forming a connection in a wellbore between two tubulars, comprising:

providing a second tubular and a first tubular having an enlarged inner diameter portion, the first tubular having a wall having a first thickness at a first portion and a second thickness at a second portion;

locating the second tubular coincident with the enlarged inner diameter portion of the first tubular; and expanding the second tubular radially, such that an outer diameter of the second tubular frictionally contacts the enlarged inner diameter portion.

21. The method of claim 20, wherein the outer diameter of the second tubular frictionally contacts the enlarged inner diameter portion of the first tubular without substantially enlarging the diameter of the first tubular.

22. The method of claim 20, wherein the second thickness is less than the first thickness.

23. The method of claim 22, wherein the second portion is at the enlarged inner diameter portion.

24. The method of claim 22, wherein the second portion is at a lower end of the first tubular.

25. The method of claim 22, wherein the enlarged inner diameter portion is at a lower end of the first tubular.

26. A connection made in a wellbore between two tubulars, comprising:

a first tubular having an inside surface, the first tubular having a wall having a first thickness at a first portion and a second thickness at a second portion; and a second tubular having an expanded diameter in contact with the inside surface of the first tubular at the second portion, whereby the diameter of the first tubular is not substantially expanded and an inside diameter of both tubulars is substantially the same.

27. The connection of claim 26, wherein the second thickness is less than the first thickness.

28. The connection of claim 27, wherein the second portion of the wall of the first tubular is an enlarged inner diameter portion.

29. The connection of claim 27, wherein the second portion is at a lower end of the first tubular.

30. A cement shoe assembly for use in a wellbore comprising:

a tubular housing for disposal at an end of a tubular string, the housing having an enlarged inner diameter portion at the lowermost end of the housing;

a drillable cement shoe portion disposed in the housing, the cement shoe portion in selective fluid communication with the tubular string; and a drillable, nose portion disposed on the lowermost end of the housing to facilitate insertion of the assembly into the wellbore, the nose portion having a bore therethrough substantially coincident with a bore of the cement shoe portion.

31. The cement shoe assembly of claim 30, wherein a drillable material of the assembly adjacent the enlarged inner diameter portion of the housing is constructed and arranged to become dislodged from the housing when the shoe is drilled with a drill having an outer diameter smaller than the enlarged inner diameter portion of the housing.

32. The cement shoe assembly of claim 31, wherein the drillable material is weakened by voids formed therein.

33. A cement shoe assembly for use in a wellbore comprising:

a tubular housing for disposal at an end of a tubular string, the housing having an enlarged inner diameter portion at the lowermost end of the housing;

a drillable cement shoe portion disposed in the housing, the cement shoe portion in selective fluid communication with the tubular string; and a drillable material adjacent the enlarged inner diameter portion of the housing constructed and arranged to become dislodged from the housing when the shoe is drilled with a cutting tool having an outer diameter smaller than the enlarged inner diameter portion of the housing.

* * * * *